(12) United States Patent
Hu et al.

(10) Patent No.: US 7,917,814 B2
(45) Date of Patent: Mar. 29, 2011

(54) SYSTEM AND METHOD OF REPORTING ERROR CODES IN AN ELECTRONICALLY CONTROLLED DEVICE

(75) Inventors: Luhui Hu, San Diego, CA (US); James E. Hasler, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 11/910,956

(22) PCT Filed: Apr. 8, 2005

(86) PCT No.: PCT/US2005/012099
§ 371 (c)(1),
(2), (4) Date: Oct. 16, 2007

(87) PCT Pub. No.: WO2006/110140
PCT Pub. Date: Oct. 19, 2006

(65) Prior Publication Data
US 2008/0141076 A1    Jun. 12, 2008

(51) Int. Cl.
*G06F 11/00* (2006.01)
(52) U.S. Cl. .............. 714/57; 714/25; 714/26; 714/48
(58) Field of Classification Search .............. 714/25, 714/26, 48, 57
See application file for complete search history.

(56) References Cited

U.S. PATENT DOCUMENTS

| | | | |
|---|---|---|---|
| 5,175,735 A | 12/1992 | Dahlby et al. | |
| 5,513,347 A | 4/1996 | Wakatsuki et al. | |
| 5,655,081 A | 8/1997 | Bonnell et al. | |
| 5,768,495 A | 6/1998 | Campbell et al. | |
| 5,961,561 A | 10/1999 | Wakefield, II | |
| 6,219,626 B1 | 4/2001 | Steinmetz et al. | |
| 6,334,193 B1 | 12/2001 | Buzsaki | |
| 6,529,856 B1 | 3/2003 | Fischer et al. | |
| 6,556,950 B1 | 4/2003 | Schwenke et al. | |
| 6,792,562 B1 * | 9/2004 | Korhonen | 714/39 |
| 6,859,749 B2 | 2/2005 | Szucs et al. | |
| 2002/0124213 A1 | 9/2002 | Ahrens et al. | |
| 2003/0077097 A1 | 4/2003 | Parry | |
| 2003/0110412 A1 | 6/2003 | Neville | |
| 2003/0110413 A1 | 6/2003 | Bernklau-Halvor | |
| 2003/0233435 A1 | 12/2003 | Bazinet et al. | |
| 2004/0143777 A1 | 7/2004 | Arend | |

FOREIGN PATENT DOCUMENTS

| | | |
|---|---|---|
| GB | 2 246 649 | 2/1992 |
| JP | 2003/256102 | 9/2003 |

OTHER PUBLICATIONS

International Search Report and Written Opinion of the International Searching Authority, dated Aug. 19, 2005.
Written Opinion of the International Preliminary Examining Authority, dated Jul. 26, 2007.

* cited by examiner

*Primary Examiner* — Robert Beausoliel
*Assistant Examiner* — Charles Ehne

(57) ABSTRACT

A method of reporting errors in an electronically controlled device, comprises generating a first bit field representative of a severity of an internal error, generating a second bit field representative of a location of the internal error; and generating a third bit field representative of a cause of the internal error. The method also comprises structuring an internal error code, wherein the internal error code includes the first, second, and third bit fields.

28 Claims, 6 Drawing Sheets

SYSTEM AND METHOD OF REPORTING ERROR CODES IN AN ELECTRONICALLY CONTROLLED DEVICE

CROSS-REFERENCE TO RELATED APPLICATIONS

This Utility patent application claims the benefit of International Application No. PCT/US2005/012099, filed Apr. 8, 2005, which is incorporated herein by reference.

BACKGROUND OF THE DISCLOSURE

An electronically controlled device may include a diagnostics system. The diagnostics system may be arranged to detect errors occurring within the device. The errors may be reported using an error code. The error code may be a number or string and may not contain any end user readable or helpful information. Some error codes are in a string (text) format which may make searching complicated. Some error codes are not scalable for product extensions. Some error codes do not contain certain categories of information, which makes it difficult to classify, prioritize and correct the errors. Troubleshooting a device which has experienced an error can be time-consuming and costly if the only information one receives from the device when an error occurs is an error code describing what has happened.

BRIEF DESCRIPTION OF THE DRAWINGS

Features and advantages of the invention will be readily appreciated by persons skilled in the art from the following detailed description of exemplary embodiments thereof, as illustrated in the accompanying drawings, in which.

DETAILED DESCRIPTION OF THE DISCLOSURE

Figure 1:
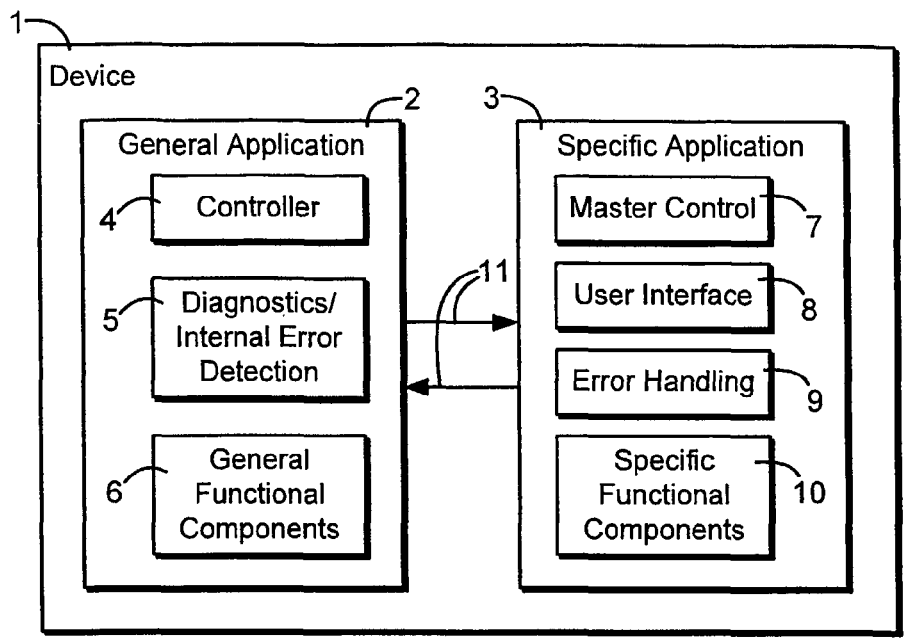
FIG. 1 illustrates a functional block diagram of an exemplary embodiment of an electronically controlled device according to an embodiment of the present invention.

In the following detailed description and in the several figures of the drawing, like elements are identified with like reference numerals.

FIG. 1 illustrates an exemplary embodiment of an electronically controlled device 1. An electronically controlled device 1 may include a general application portion, module or sub-system 2 and a specific application portion, module or sub-system 3. One manufacturer may provide a general application sub-system 2 to another manufacturer or manufacturers, which may in turn incorporate the general sub-system 2 into an electronically controlled device 1. The general and specific sub-systems 2, 3 may operate together to provide the specific functionality of the device 1.

In an exemplary embodiment, the general application sub-system 2 may include a controller 4, a diagnostics/internal error detection unit 5 and general functional components 6. In the case of a printer, for example, the general functional components 6 may be, for example, an imaging module 17, ink delivery system (IDS) 21 and/or a service station (SVS) 24 (as illustrated, for example, in FIG. 2). In an exemplary embodiment, the terms controller 4, diagnostics/internal error detection unit 5 and general functional components 6 are used as general functional features; the features may or may not include or be part of common components with other features and may or may not overlap with other features structurally and/or functionally. For example, the error detection and reporting unit 5 may include portions of software 14 (FIG. 2) stored on the controller 2 or elsewhere.

In an exemplary embodiment, the specific application sub-system 3 may include a master controller 7, user interface 8, error handling system 9 and specific functional components 10. In an exemplary embodiment, these features are used to generally describe functional features; the features may or may not include or be part of common components with other features and may or may not overlap with other features structurally and/or functionally. In an exemplary embodiment, the master controller 7 may include at least one of a computer, PC, CPU or other electronic control device. The master controller 7 may operate in conjunction with the controller 4 to control the operation of the device 1. In an exemplary embodiment, the master controller 7 may control the overall function and operation of the device 1. The controller 4 may control the general function of the general application sub-system 2 when the master controller 7 causes the general application sub-system 2 to operate.

In an exemplary embodiment, the general application sub-system 2 and specific application sub-system 3 may communicate with each other through a communications connection 11 using a communications protocol, for example an Ethernet, local area network (LAN) and/or RS-232. In an exemplary embodiment, the general application subsystem 2 may communicate or report internal errors detected in the general application sub-system to the specific application sub-system. In an exemplary embodiment, the master controller 7 may periodically poll the controller 4 to determine the operational status of the general application subsystem 2 and may be programmed to take appropriate action based on an error code or error codes communicated to the master controller 7 from the controller 4 and/or to provide an end user with visually perceptible instructions, for example through a visual display which may be part of the user interface 8, to take certain action to recover from an error or problem which prompted the error code or error codes to be generated.

For example, in an exemplary embodiment, an imager manufacturer may provide an imaging sub-system, as one form of a general application subsystem 2, suitable for being incorporated into any of several specific applications, for example printing applications. For example, an imager manufacturer may provide an imaging sub-system 2 which could be incorporated into a specific form printing application, mail printing application, transaction printing application, other cut-sheet or web printing applications, or any other suitable system, imaging system and/or printing system which may incorporate an imaging sub-system. In an exemplary embodiment, an imaging sub-system may provide for or support ink-jet printing, laser jet printing, thermal printing, and/or laser or radiation imaging on a laser or radiation-sensitive medium. In an exemplary embodiment, the specific application sub-system 3 may include specific functional components 10, which in the case of a printer may be, for example, media handling equipment such as a paper tray and/or roller.

In an exemplary embodiment, the general application sub-system 2, for example an imager sub-system, may include a diagnostics/internal error detection system 5 which may be common for all specific applications into which it may be incorporated. Providing an error-detection and reporting unit 5 with a reporting system that is structured, predictable and common to all specific applications platforms and/or devices into which it is incorporated may reduce development costs. Customers, including for example original equipment manufacturers (OEM) of the specific applications devices 1, may be provided with sufficient documentation so that they may design the error handling system 9 to respond appropriately to errors detected in and reported from the general application sub-system 2.

Figure 2:
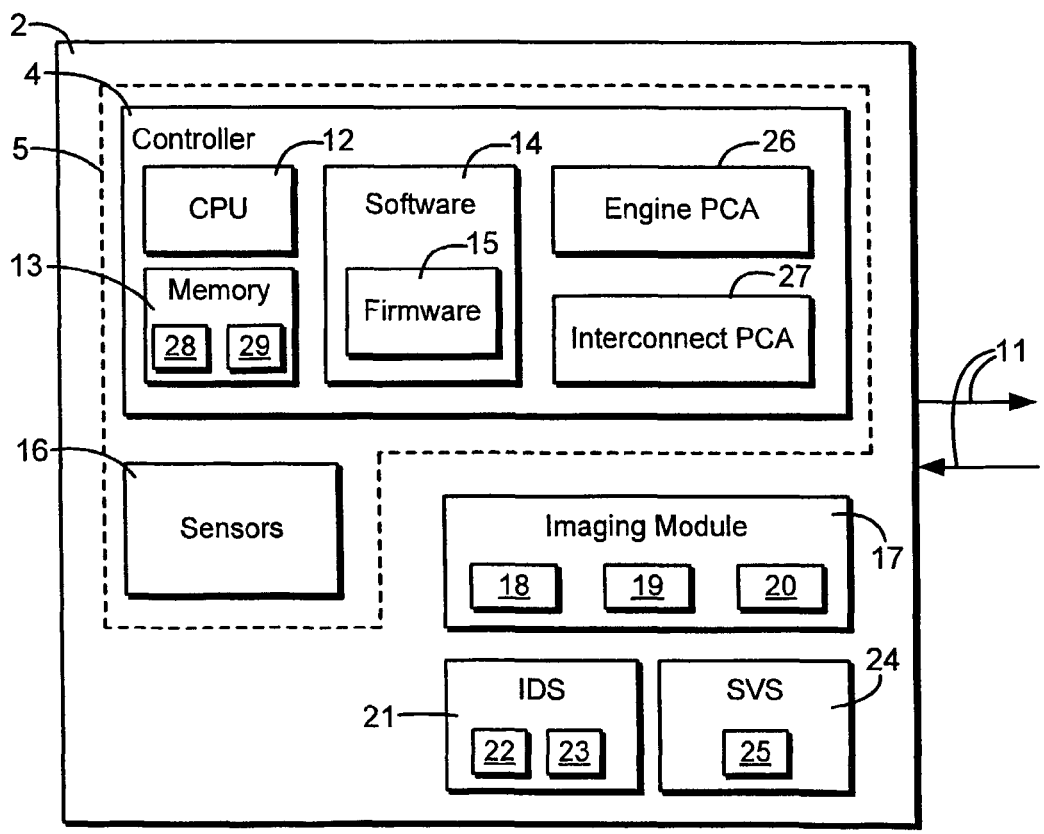
FIG. 2 illustrates a functional block diagram of an exemplary embodiment of a general application sub-system according to an embodiment of the present invention.

FIG. 2 illustrates a functional block diagram of an exemplary general application sub-system 2. The general application sub-system 2 shown in FIG. 2 may be an imager sub-system. Although the sub-system 2 shown in FIG. 2 includes some features which may be included in an imager sub-system, it is not intended to imply that all of the features shown are only applicable in the case of an imager.

In an exemplary embodiment, the general application sub-system 2 includes a controller 4. In an exemplary embodiment, the controller 4 may include one or more of a PC, microprocessor or CPU 12, memory 13, ASICS, software 14 and/or firmware 15. In an exemplary embodiment, the memory may include a hard drive, DRAM, SRAM, EPROM or other memory. The memory 13 may include more than one memory component. In an exemplary embodiment, the term software 14 may generally be used to encompass the term firmware 15. The software 14 may be stored in memory 13 on a hard disc and/or on other memory devices and may include firmware 15. The software 14, including the firmware 15, may include a plurality of software components.

In an exemplary embodiment, a controller may include a print engine printed circuit assembly (PCA) 26 and/or an interconnect PCA 27. In an imager sub-assembly 2, the print engine PCA 26 may provide imaging or printing functionality. The interconnect PCA 27 may provide some control for the communications protocol 11.

An exemplary general application sub-system 2 may include sensors, detectors and/or monitors 16. In an exemplary embodiment, the sensors, detectors and/or monitors 16 may be arranged to monitor system operational conditions, characteristics and/or parameters.

In an exemplary embodiment, the software 14 and firmware 15 may be programmed to detect operational conditions, characteristics and/or parameters which may be indicative of proper performance and which may be indicative of an error where certain operational conditions, characteristics and/or parameters are detected, sensed or monitored. In an exemplary embodiment, the software 14 and/or firmware 15 may be programmed to generate an internal error code when certain operational conditions, characteristics and/or parameters are detected, monitored and/or sensed.

In an exemplary embodiment, the sensors, monitors and/or detectors 16 may be located in various locations throughout the general application sub-system. The sensors, monitors and/or detectors 16 may be associated with software 14 and/or firmware 15 components which are programmed to recognize internal operating errors and to generate an internal error code responsive to the error. In an exemplary embodiment, a diagnostics/internal error detection unit 5 may be said to include the controller 4, including the software 14 and firmware 15, and the sensors 16. In an exemplary embodiment, the error detection unit 5 may be arranged to detect and identify operational errors or problems arising in the operation of the sub-system and/or any of its components. For example, the error detection system may be arranged to detect physical faults, short or open circuits, software failures, firmware failures, communication failures or system component failures.

In an exemplary embodiment, a general application sub-system 2 which may be an imaging sub-system may include an imaging module 17, which may have a carriage PCA 18, backplane PCA 19 and/or a printhead 20. The sub-system 2 may also include an ink delivery system (IDS) module 21, which may have an IDS PCA 22 and/or an ink supply 23, and may include a service station (SVS) module 24 which may include an imaging module servo PCA 25. In other embodiments, an imaging sub-system may include laser jet printing components, such as a laser and toner, and/or may include thermal imaging or radiation imaging components, such as, for example, a laser. In an exemplary embodiment, the imaging module 17, IDS 21 and/or the SVS module 24 may be general functional components 6 (as described and discussed above with respect to FIG. 1).

In an exemplary embodiment, the software 14 and firmware 15 may include software components (firmware components may be considered software components) corresponding to each of the various components included in the sub-system 2. In an exemplary embodiment, software components corresponding to each of the components may be programmed to identify internal errors occurring in the operation of the corresponding components and to generate a structured internal error code responsive to a detected, sensed or monitored operating condition, characteristic or parameter.

In an exemplary embodiment, a structured error code, for example an internal error code 30 (FIG. 3) or an external error code 50 (FIG. 5), may be generated in response to sensed, detected and/or monitored operational condition, characteristic and/or parameter indicative of such an internal error (internal error). An error code 30, 50 may be structured to be representative of information relating to the internal error. For example, a structured internal error code 30 may be structured to provide information relating to the severity of the error, location of the error (for example, the component in which the error occurred), and the nature or cause of the error.

In an exemplary embodiment, a structured error code may: (1) describe what the error or problem is and/or why it has occurred; (2) inform a customer or user of the severity of the event; (3) inform the customer or user as to what area of the system the event has occurred; (4) inform the user as to what needs to be done to remedy the problem so that normal operation can resume. In an exemplary embodiment, the structured error codes may be logged for use in servicing a device.

Figure 5:
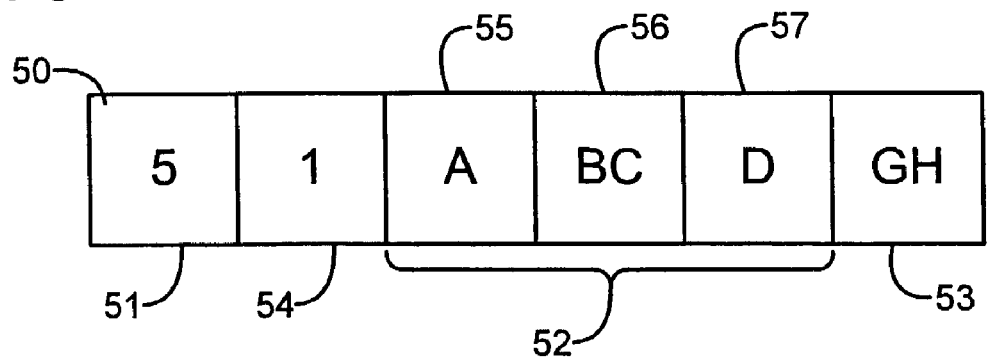
FIG. 5 illustrates an exemplary format of a structured external error code according to an embodiment of the present invention.

In an exemplary embodiment, a structured error code may be represented by an unsigned hexadecimal integer, such as 0x50ABCDEF. The size of the error code may depend on the complexity of the product and how many errors, severity levels, locations and recovery actions there are for the product. There may be at least two types of error codes: internal error code 30 (FIG. 3) and external error code 50 (FIG. 5). In an exemplary embodiment, any of the fields, as desired, discussed above, may be scaled according to the demands of a particular system. For example, the location digits may be scaled to represent the desired number of identifiable components, modules and indices.

An internal error code 30 may specify the root cause of an error and may be used by engineers and technicians during product development or to obtain more information about the root cause of a particular failure and may be useful in design improvement, service and planning. An external error code 50 or customer error code may be intended for error solution and error recovery action. In an exemplary embodiment, customers or users may be given access to or provided with only the external error code 50 or only some of the information contained within the external error code 50. In an exemplary embodiment, a dual-error code system, for example a system which generates an internal error code and an external error code responsive to a detected error, may collect information to assist a manufacturer or distributor of a general application sub-system improve the sub-system design and service the sub-system, while protecting potentially valuable information regarding the root cause of errors from disclosure to others, for example the specific application manufacturer. Such a system may hide certain information while providing the customer and/or user with information sufficient to understand which components have experienced errors and what action may be taken to recover from the error.

Referring to FIG. 2, the memory 13 may include a pre-programmed list or table 28 of expected internal error codes used for mapping error codes to corresponding external error codes. The memory 13 may also include an error history 29 where a list of internal error codes and/or external error codes which have been generated or will be generated may be stored.

In an exemplary embodiment, the term "internal" when used in conjunction with internal error refers to the error as having occurred internally to the general application sub-system. The terms internal and external when used with respect to the error codes, for example, internal error code and external error code, refer to whether the error code is communicated to a specific application sub-system or not. In the case of an internal error code, the error code is stored within the general sub-system 2 and is not communicated to the specific application sub-system 3. In the case of an external error code, the external code includes information relating to an internal error, but is considered external because it is communicated to a specific application sub-system 3 which may be external to the general application sub-system 2.

Figure 3:
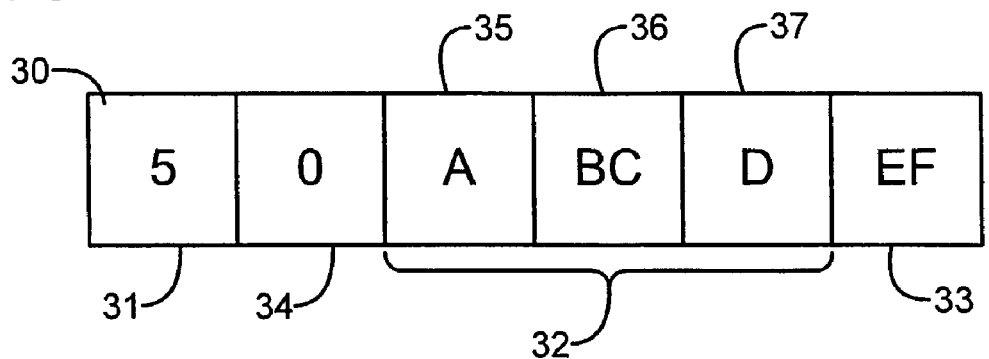
FIG. 3 illustrates an exemplary format of a structured internal error code according to an embodiment of the present invention.

FIG. 3 illustrates an exemplary format for a structured internal error code 30. In an exemplary embodiment, an internal error code may be used to describe a problem/event/error in terms that a general application sub-system manufacturer or distributor would use, for example with detail revealing specific ASIC or circuit names or other detailed information that only an engineer or technician familiar with the sub-system or with access to more detailed technical documentation may be familiar with and/or be able to understand or interpret.

In an exemplary embodiment, the internal error code 30 may be represented by a mathematical representation capable of being stored and/or transmitted in electronic form, for example as an unsigned, 4-byte hexadecimal integer with a format such as 0x50ABCDEF. The internal error code 30 may include a number of separate bit fields. The size and number of the bit fields may be sized and/or structured to include sufficient information to identify potential errors in the various components of the general application sub-assembly in which errors may be expected to occur. For example, an error code for a sub-assembly that has relatively more components and relatively more potential errors may have error codes that have more or larger bit fields than another, relatively simpler sub-assembly with relatively fewer components and/or fewer potential errors. In an exemplary embodiment, each bit field is designated to hold encoded information, wherein the encoded information in each bit field may be used to identify the root cause of an error, the component in which the error occurs and may include a code indicative of the severity of the error. In an exemplary embodiment various combinations and permutations of the bit fields may be sufficient to uniquely identify the potential errors which the designer or development team believes are desirable to identify and report. In an exemplary embodiment, the number and size of the bit fields in an internal error code 30 may be selected so that the error code may include information sufficient to uniquely identify as many of the potential errors and components as desired.

During the design, development and/or implementation of a sub-assembly, the developers may identify components, modules, software components, structures, circuits or other portions which may be subject to errors during operation. The development team may test the sub-assembly to identify operational conditions, characteristics and/or parameters which may be detected, sensed or monitored which may be indicative of such expected, possible errors. The various errors may be characterized by severity, location, and type or cause of the error. Depending on the number of locations, components or portions in which errors may occur, and the number and types of errors, the minimum desirable number and size of the error code integers and/or bit fields may be determined. In an exemplary embodiment, the error code may include information relating to severity, location (component) and error type.

In an exemplary embodiment, the internal error code 30 may include bit fields representative of categories of information which identify the internal error. The bit fields may include bit fields representative of the error's severity 31 (ranging, for example, from low to high), location 32 (representative of the component, part or element of the system where the error is located or occurred) and the error number 33 (designating the root cause as specifically as the diagnostics system can determine the error).

The exemplary embodiment shown in FIG. 3 also includes a bit field representative of the type of error code 34—for example internal error code 30 or external error code 50 (FIG. 5). An external error code, or customer error code, may be intended for use by an OEM customer, end users and/or for communicating to a specific application sub-system 3. Exemplary embodiments of an external error code are discussed more fully below.

An exemplary internal error code 30 may be structured to indicate a more detailed root cause of an error and may be intended for use by engineers and/or technicians of the manufacturer or distributor of the general sub-system 2 (FIG. 1). In an exemplary embodiment, retaining a log of internal error codes 30 for use by a general sub-system distributor or manufacturer may aid in the development of information and/or statistics which may be used, for example, in understanding and/or determining the root causes of problems, errors and/or failures. In an exemplary embodiment, the distributor or manufacturer may gain access to these stored, logged and/or recorded error codes, for example, when a unit is returned under warranty or when it is serviced under a repair contract.

In FIG. 3, for example, an exemplary internal error code 30 may be represented by hexadecimal digits. In an exemplary embodiment, each bit field may include sufficient bits to carry the information and may include an encoded number, letter, digit or other representation that relates to the information for the particular error which was identified and for which the error codes are generated. In an exemplary embodiment, the code or codes may be scaled to an appropriate size depending on the application.

Severity

In an exemplary embodiment, the bit field indicative of error severity 31, may be represented on a scale from 0 to 4, where 0 is the lowest, and 4 is the highest level of severity as shown in Table 1 below:

TABLE 1

Error Severity

| Severity | Level | Name | Description |
|---|---|---|---|
| 0 | Lowest | Information | Just for non-fatal and helpful information |
| 1 | Lower | Warning/Advisory | Warning or unexpected event - may cause fatal error |
| 2 | High | Intervention Alert | Pauses printing - enters intervention state for serving |
| 3 | Higher | Severe | System hardware-only shutdown in a normal mode |
| 4 | Highest | Emergency | Shutdown the system as soon as possible |

Code Type

In an exemplary embodiment, the code type bit field 34 may be represented by a 0, which may be indicative of an internal error code. As described below, in the case of an external error code, the code type bit field 34 may have a 1, which may be indicative of a customer error code.

Location

In an exemplary embodiment, the location 32 may be identified by several bit fields. The number of bit fields required or desirable may depend on the complexity, number of component parts and the need or desire to size the location bit field to provide sufficient or desirable amount of differentiation and identification of various errors. In a sub-system with only a few identifiable components, only one bit may be desirable. In a sub-system with many components with various identifiable functional modules, sub-components or groups of components, the location bit field 32 may include several bits or bit fields. The location bit field 32 may include, for example, component bit fields corresponding to a module ID 35, a component ID 36, and an index 37.

The module ID 35 may be used, for example, where a system has two identical system components or functional components. For example, a general functional sub-system which is an imager sub-system may include one controller and two more imaging modules and two or more corresponding IDSs and/or SVSs. Each of the two or more modules may be identical or similar and may include similar components. When an error occurs in one of the modules, the module ID bit field may be used to designate which of the several modules experienced the error. This may resolve any ambiguity that may otherwise exist in the error reporting.

For example, in an exemplary embodiment with two sets of imaging modules, IDSs, and SVSs, but driven by a single imager controller, a 0 may represent an error in the first module and a 1 may be used to identify an error in the second module. If only one module is present, the bit may be omitted, or set to zero. In an exemplary embodiment, a manufacturer may program the controller such that internal error codes 30 include a module bit field 35, even where the component does not include more than one module. Including the bit field may make it more convenient to expand its product line to include multi-module products in the future, without re-programming the controller, software and/or error detection unit.

In an exemplary embodiment, the component ID bit field 36 may include information identifying the particular component in which an error occurs. The component ID bit field may 36 include a pre-determined designator for one of any of the various, identifiable, separate components, for example physical components or software (software or firmware) components. In an exemplary embodiment, the components of a device which is an imager may include the following separate components which may be identified by the corresponding component ID:

TABLE 2

Component ID Mapping

| Component Name | Component ID (hexadecimal) |
|---|---|
| System | 00 |
| Imager Controller | 10 |
| Engine PCA | 11 |
| Interconnect PCA | 12 |
| Formatter PCA | 13 |
| CPU/Fan Module | 14 |
| PC Memory | 15 |
| Fans | 16 |
| Hard Disk Drive | 17 |
| Power Supply | 18 |
| Internal Cables | 19 |
| Other accessories | 1A |
| Imaging Module | 20 |
| Carriage PCA | 21 |
| Backplane PCA | 22 |
| Printhead | 23 |
| Power Cable | 24 |
| Data Cable | 25 |
| Service Station | 30 |
| Brick Servo PCA | 31 |
| SVS Cable | 32 |
| Printhead Crash Protection Plate | 33 |
| IDS | 40 |
| IDS PCA | 41 |
| Ink Supply | 42 |
| IDS Cable | 43 |
| Air Pump | 44 |
| Valve | 45 |
| Ink Stall Assembly | 46 |
| Ink Tube | 47 |
| Software (Internal) | F0 |
| Print Engine Firmware | F1 |
| ARM Firmware | F2 |
| Formatter Firmware | F3 |
| Test Modules | FF |

Figure 4:
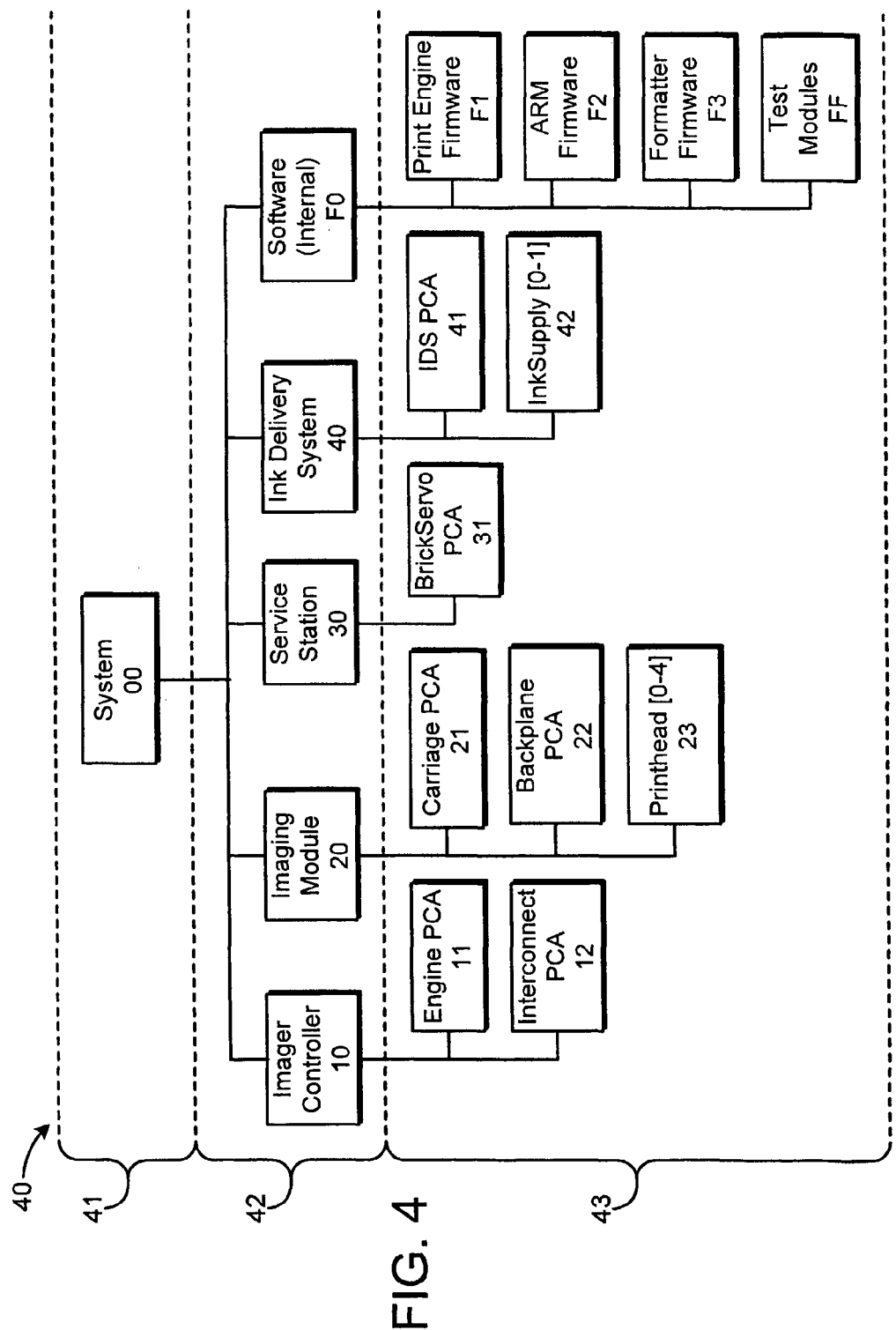
FIG. 4 illustrates an exemplary component topology for an exemplary general application sub-system according to an embodiment of the present invention.

FIG. 4 illustrates an exemplary component topology 40 for mapping the component ID error codes and assigning component IDs. In an exemplary embodiment, there may be three levels: system 41, module 42, sub-module 43. For example, if an error happens inside engine PCA, its error code should not use imager controller ID. If an error belongs to the system component, it may not also belong to any specific other components. For example, "00" may be used for an error that could not be isolated to a specific lower-level component. The various system modules and sub-modules illustrated in FIG. 2 correspond to components listed in Table 2. The numbers within the various system, module and/or sub-module boxes represent exemplary code numbers which may be placed in a component ID bit field 36 and/or location bit field 32 to identify a component in which a detected internal error occurred; they should not be confused with reference numerals in this or other figures.

Index

In an exemplary embodiment, the location field 32 may include an index bit field 37 to further identify an error where the component ID error may be otherwise ambiguous. For example, certain errors may be identical but occur at different component parts. For example, a printhead may include more than one pen. When a pen-missing error is detected and the error number bit field 33 includes a number representative of a missing pen error, the index field may be used to identify which of several pens was missing. In addition, where the error number bit field 33 includes an error number of a type of error that may occur in any of several component locations, the index field may be used to identify which of those components experienced the detected internal error. For example, "print control ASIC communication failure" and "image processing pipeline ASIC communication failure" may have the same error number—relating to ASIC communication failure—and the index field may be used to identify which ASIC experienced the communication failure. If the index is not applicable, it may be set to 0.

Error Number

In an exemplary embodiment, a unique error number is used to represent known, predicted or expected types of errors which may occur in a sub-system. This error number may be available only in the internal error code and not in an external error code. An exemplary, non-exhaustive and non-exclusive table of representative errors and associated, corresponding, assigned error numbers to be placed in an error code bit field 54 are listed in Table 3, below:

TABLE 3

| Error Number (hexadecimal) | Definition |
|---|---|
| 00 | No error |
| | Generic |
| 01 | ASIC communication failure |
| 02 | EEPROM communication failure |
| 03 | Other system communication failure (such as ADC) |
| 04 | System memory error |
| 05 | Sensor signal failure |
| 06 | Out of operation temperature range (over-temperature or under-temperature) |
| 07 | PCA revision or type is not valid |
| 08 | Cable is not connected or damaged |
| 09 | Out of operation humidity range (too-dry or too-wet) |
| 0A | Actuator broken or not present |
| 0B | LED is not installed or broken |
| | Imager Controller |
| 20 | Encoder/Paper moving in wrong direction or encoder phases swapped |
| 21 | TOF rejection or timeout |
| 22 | Media moving too fast |
| 23 | Page skip warning |
| | Imaging Module |
| 30 | Printhead missing |
| 31 | Flex circuit not present or not installed properly via Flex sense circuit |
| 32 | Carriage board not correctly seated into back plane PCA |
| 33 | Printhead continuity errors |
| 34 | Failure to read/write to printhead acumen |
| 35 | Failure to read valid signal from Printhead TSRs |
| 36 | Printhead 5 v undervoltage |
| 37 | Printhead 5 v overvoltage |
| 38 | Printhead 12 v undervoltage |
| 39 | Printhead 12 v overvoltage |
| 3A | Printhead Vpp undervoltage |
| 3B | Printhead Vpp overvoltage |
| 3C | Printhead Vpp current leakage |
| 3D | Printhead Vpp undervoltage |
| 3E | Printhead Vpp overvoltage |

TABLE 3-continued

| Error Number (hexadecimal) | Definition |
|---|---|
| 3F | Printhead digital TSR reads above safety threshold |
| 40 | Printhead analog TSR reads above safety threshold |
| 41 | ADC voltage channel error |
| 42 | Printhead wrong model |
| 43 | Printhead register error |
| 44 | Printhead energy calibration error |
| 45 | Printhead shunt regulator error |
| 46 | Printhead vlogic related error |
| 47 | Printhead vpp related error |
| 48 | Dump printhead warning |
| | SVS |
| 60 | HV ASIC regulator overcurrent |
| 61 | Motor is either not present or not functioning properly |
| 62 | Brick not connected to lift transmission |
| 63 | Printhead cleaner door not closed |
| 64 | SVS I2C ADC voltage channel error |
| 65 | SVS I2C GPIO error |
| 66 | SVS_undervoltage error |
| 67 | SVS register R/W error |
| 68 | SVS digital sensor calibration error |
| 69 | SVS PWM excessive current error |
| 6A | SVS servicing related error |
| 6B | Printhead cleaner need to be replaced |
| | IDS |
| 80 | PILS circuit out of range |
| 81 | Ink supply not detected |
| 82 | Error reading/writing IDS |
| 83 | ILS air pressure sensor out of range —too high |
| 84 | ILS air pressure sensor out of range —too low |
| 85 | Air leak/Ink leak/broken bag detection |
| 86 | IDS valve activation error |
| 87 | Ink supply wrong model |
| 88 | Air pressure control failure |
| 89 | IDS I2C ADC voltage channel errors |
| 8A | Ink level errors |
| 8B | IDS actuator interrupt mask failure |
| 8C | Supply is unapproved |
| 8D | Supply was altered |
| 8E | Supply bad family ID |
| 8F | Supply bed for ILS |
| 90 | Supply bad PILS gain |
| 91 | Supply bad PMRC |
| 92 | Supply bad ILC |
| 93 | Supply bad freshness |
| 94 | Supply bad max use time |
| 95 | Supply wrong size |
| 96 | Supply not valid for purge |
| 97 | Supply no jet series |
| 98 | Supply user validation pending |
| 99 | Supply expired |
| 9A | Supply fails continuity |
| 9B | Supply ILS errors |
| 9C | Supply bad smart chip info |
| 9D | Supply smart chip template |
| 9E | Supply retired ILC |
| 9F | Supply almost out of ink |
| | Firmware |
| A0 | TCP/IP socket communication error |
| A1 | RS232 COM communication error |
| A2 | Virtual memory error |
| A3 | Image file error |
| A4 | Thread error |
| A5 | IPC error |
| A6 | Print engine boot up error |
| A7 | TCL interpreter error |
| A8 | Invalid parameters or formats |
| A9 | Failure to upgrade system software |
| AA | Data timeout during job |
| AB | Watchdog timeout |
| F0 | Software assert error |
| FF | Unknown Error |

In an exemplary embodiment, the general application subsystem may be arranged to generate appropriate error codes, which are indicative of and/or representative of information identifying errors which may be sensed or detected during operation.

External Error Codes

FIG. 5 illustrates an exemplary format for a structured external error code 50. In an exemplary embodiment, an external error code field may describe the problem using terms and component names that an end user customer may be expected to understand. These external error codes 50 may not include any detail beyond the spare or replacement part level of the product as there is no need to refer to something that the customer cannot replace. For example, if a printhead must be replaced if one of several pens fails, an external error code 50 may include information relating only to the printhead—without specific detail as to which pen failed or how. This philosophy may help avoid confusing customers or users by providing extraneous information which they may not be in a position to understand. As a result, in an exemplary embodiment, multiple internal error codes may result in a common external error code or be mapped to a single external error code.

In an exemplary embodiment, a general application subsystem may also be arranged to generate an external error code 50 or customer error code in response to a detected, sensed or monitored internal error. The external error code 50 may be designed for external, end user customers of the product. In an exemplary embodiment, an external error code may include information indicative of or representative of the severity and location of an internal error and may include information related to a recommended recovery action to be taken in response to such an error. An exemplary external error code 50 may assist a user to take steps which may help resume normal operation of the device.

In an exemplary embodiment, the external error code 50 may be represented by a mathematical representation capable of being stored and/or transmitted in electronic form, for example as an unsigned, 4-byte hexadecimal integer with a format such as 0x50ABCDGH. The external error code 50 may include a number of separate bit fields. The size and number of the bit fields may be sized and/or structured to include sufficient information to identify all of the expected, possible errors to all of the expected, possible components subject to errors in the general application sub-assembly. In an exemplary embodiment, each bit field is designated to hold encoded information, wherein the encoded information in each bit field may be used to identify the root cause of an error, the component in which the error occurs and may include a code indicative of the severity of the error.

In an exemplary embodiment, the external error code 50 may include bit fields representative of categories of information which identify the component in which the error occurred and a recommended recovery action to be taken in response to the error. The bit fields may include bit fields representative of the error's severity 51, location 52, and recovery action 53 (designating the root cause as specifically as the diagnostics system can determine the error). In an exemplary embodiment, the severity and location fields may be similar or identical to the content of corresponding fields in an internal error code described above, with respect to FIG. 3. For example, the location bit field 52 may include several component bit fields including, for example, a module ID bit field 55, component ID bit field 56 and an index bit field 57. An error type bit field 54 may include a number which indicates that the error code is an external error code 50. For example, a 1 in the error type bit field 54 may indicate that the error code is an external error code 50.

An external error code may not include an error number bit field identifying the root cause of an internal error. An exemplary external error code 50 may, however, include a recovery action bit field 53 representative of or indicative of a recommended recovery action to be taken in response to a detected internal error. In an exemplary embodiment, the letters "GH" used in the recovery action bit field 53 are used as placeholders to indicate that, in an exemplary embodiment, the content of the recovery bit field 53 may be different from the content of error number bit field 33 (FIG. 3).

Recovery Action

In an exemplary embodiment, a recovery action may be represented by two hex digits. A recovery action may define a high-level error description including recovery action or warning information. In an exemplary embodiment, the list of recommended recovery actions may be broken down into three sections: severe section, warning section, and service section. An table of exemplary recovery action codes is shown in Table 4 below:

TABLE 4

Recovery Actions

| Recovery Action (hexadecimal) | Definition |
| --- | --- |
| 00 | Do nothing |
|  | Replacement |
| 01 | Replace |
| 02 | Replace due to major damaged |
| 03 | Replace due to minor damaged |
| 04 | Replace due to wrong part |
| 05 | Replace due to wrong revision |
| 06 | Replace due to invalid smart-chip information |
| 07 | Replace sensor |
| 08 | Replace actuator |
| 09 | Replace LED |
| 10 | Add due to missing part |
| 11 | Add accessory |
|  | Adjustment |
| 20 | Power off and restart the imager system |
| 21 | Reseat/reconnect (automatically) |
| 22 | Reseat/reconnect (manually) |
| 23 | Align/adjust/calibrate (automatically) |
| 24 | Align/adjust/calibrate (manually) |
| 25 | Close/open (automatically) |
| 26 | Close/open (manually) |
| 27 | Clean (automatically) |
| 28 | Clean (manually) |
| 29 | Upgrade system software (firmware or test modules) |
| 2A | Upgrade drivers or computer software |
|  | Warning Information |
| 40 | An unknown warning or intervention alert |
| 41 | TCP/IP socket communication error |
| 42 | RS232 COM communication error |
| 43 | System communication failure (HCl or CAN) |
| 44 | Smart chip communication error |
| 45 | Out of operation temperature range |
| 46 | Out of operation humidity range |
| 47 | Out of operation current range (such as PWM) |
| 48 | Out of operation voltage range |
| 49 | Out of operation pressure range |
| 4A | Out of ink |
| 4B | Dummy printhead warning |
| 4C | SVS cleaner warning |
|  | Job-Related Event |
| 80 | Encoder/Paper moving in wrong direction or encoder phase swapped |
| 81 | TOF rejection or timeout |

TABLE 4-continued

Recovery Actions

| Recovery Action (hexadecimal) | Definition |
|---|---|
| 82 | Media moving too fast |
| 83 | Page skip warning |
| 84 | Image file error |
| 85 | Data timeout during job FW Error |
| A0 | Assert Error |
| A1 | OS resource error |
| A2 | Firmware internal error |
| A3 | System software upgrade failure Generic |
| FE | Refer to service manual |
| FF | Contact service & support |

As discussed above, in an exemplary embodiment, developing or manufacturing a general application sub-system may include determining a list of expected, possible, known errors and arranging or programming the sub-system to detect and identify internal errors. The sub-system may generate an internal error code responsive to the error. The sub-system may also be arranged or programmed to map each of the possible, expected internal error codes to a corresponding external error code.

In an exemplary embodiment, providing both an internal error code 30 and an external error code 50 may help provide users with useful information relating to taking corrective action without the general sub-system manufacturer's assistance (thereby, for example, saving on service costs) as provided in the customer error code, without disclosing possibly sensitive and/or confidential general sub-system manufacturer information, as provided in the internal error code 30. The internal error code may include information relating to the root cause of errors that the manufacturer or distributor may not want to share with the specific application sub-system OEM. The structured error code format may assist a specific application sub-system manufacturer understand generally which component is experiencing an error and what action to take in response to the error.

Structured System

In an exemplary embodiment, a general application sub-system 2 (FIG. 1) may use a structured error code system 60 (FIG. 6) to identify, log, manage and handle internal errors which occur within the sub-system. The sub-system may identify errors and generate, log and handle corresponding internal error codes 30 (FIG. 3) and generate, log and communicate external error codes 50 (FIG. 5) to a specific application sub-system. Both the internal and external error codes may be structured error codes 30, 50 (FIGS. 3, 5) which reflect information relating to the error, including for example severity, location, root cause and/or recovery action.

Figure 6:
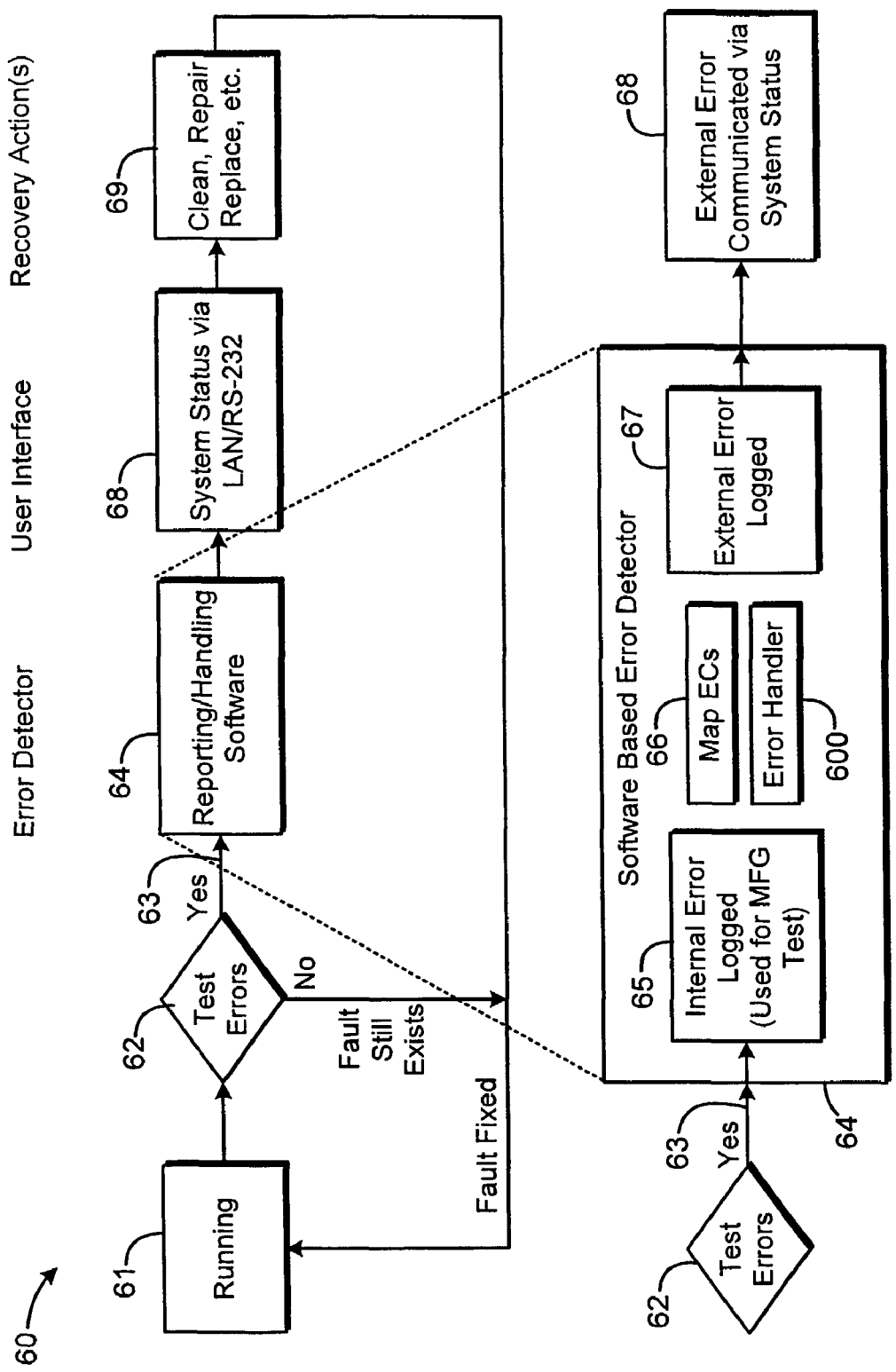
FIG. 6 illustrates an exemplary method of operating a structured error code system according to an embodiment of the present invention.

Referring to FIG. 6, in an exemplary embodiment, operation of a device with a structured error code system 60 includes running or operating 61 a general application sub-system. During operation, the diagnostics unit 5 continually diagnoses, monitors or tests 62 various operational characteristics, conditions and parameters for errors or problems. Software components corresponding to each of the components in which an error may occur are programmed to generate an appropriate structured internal error code when an internal error occurs and is detected.

In an exemplary embodiment, when an error occurs and is detected, an internal error code is generated 63 and communicated to or accessed by an error reporting and handling system 64 which may include software.

The error handling and reporting system 64 may log 65 the internal error code. Logging 65 the internal error code may include logging the error code with a time stamp or other, supplementary identifying information. The internal error code may be logged and saved on the device in a data logging system, which may record the generated error codes, for example internal error codes and external error codes, into a system history recording database (for example the history 29 (FIG. 2)). In an exemplary embodiment, the system history may be accessible only to technicians service personnel for the general application sub-system manufacturer.

In an exemplary embodiment, the internal error code is also sent to or accessed by a software component which may be an error manager which maps 66 the internal error code to a corresponding external error code (EC). In an exemplary embodiment, a look-up table with a list (for example the list or table 28 (FIG. 2)) of possible, expected internal error codes was developed and saved in memory in the general application sub-system. The look-up table may map each of the internal error codes to an appropriate, corresponding one of the external error codes. In an exemplary embodiment, the internal error codes may be structured as discussed above with respect to FIG. 3 and the external error codes may be structured as discussed above with respect to FIG. 5.

In an exemplary embodiment, the external error codes are logged 67 by saving it in memory, for example by saving it in the system history database. In an exemplary embodiment, logging the external error codes may include saving the error code with a time stamp or other identifying information.

In an exemplary embodiment, the error handling/reporting system 64 may communicate 68 the external error code to the specific application sub-system over a communications link 11 with a communications protocol such as LAN or RS-232. In an exemplary embodiment, some action may be taken 69 responsive to the external error code. The specific application sub-system may automatically take action 69 or the user may take action 69 to recover from the error. In an exemplary embodiment, a user or technician may consult a service manual for assistance in responding to the error.

In an exemplary embodiment, the system may continue operating 61 and retest 62 for the error—if the error still exists, the error code may be regenerated and enter the error handling/reporting system. If the error does not exist, the system may be restored to normal operation.

In an exemplary embodiment, the error handling/reporting system 64 may include an automated error handler 600, which may include, for example, a software component. In an exemplary embodiment, the internal error code may be provided to or accessed by the automated error handler which may be programmed to take certain actions automatically if desirable in response to a particular error or type of error. In an exemplary embodiment, the error handler may take action dependent on the severity of the error as indicated in the severity bit field of an internal error code.

In an exemplary embodiment, an error handling and management method using a structured error code system 60 may include an error occurring. In response, the system may generate 63 an internal error code. The internal error code may be structured. The automated error handler 64 or error handling software component may receive or access the internal error code. In an exemplary embodiment, the error handler 600 may parse the structured internal error code and may control the sub-system to take action to correct an error without user intervention.

Figure 7:
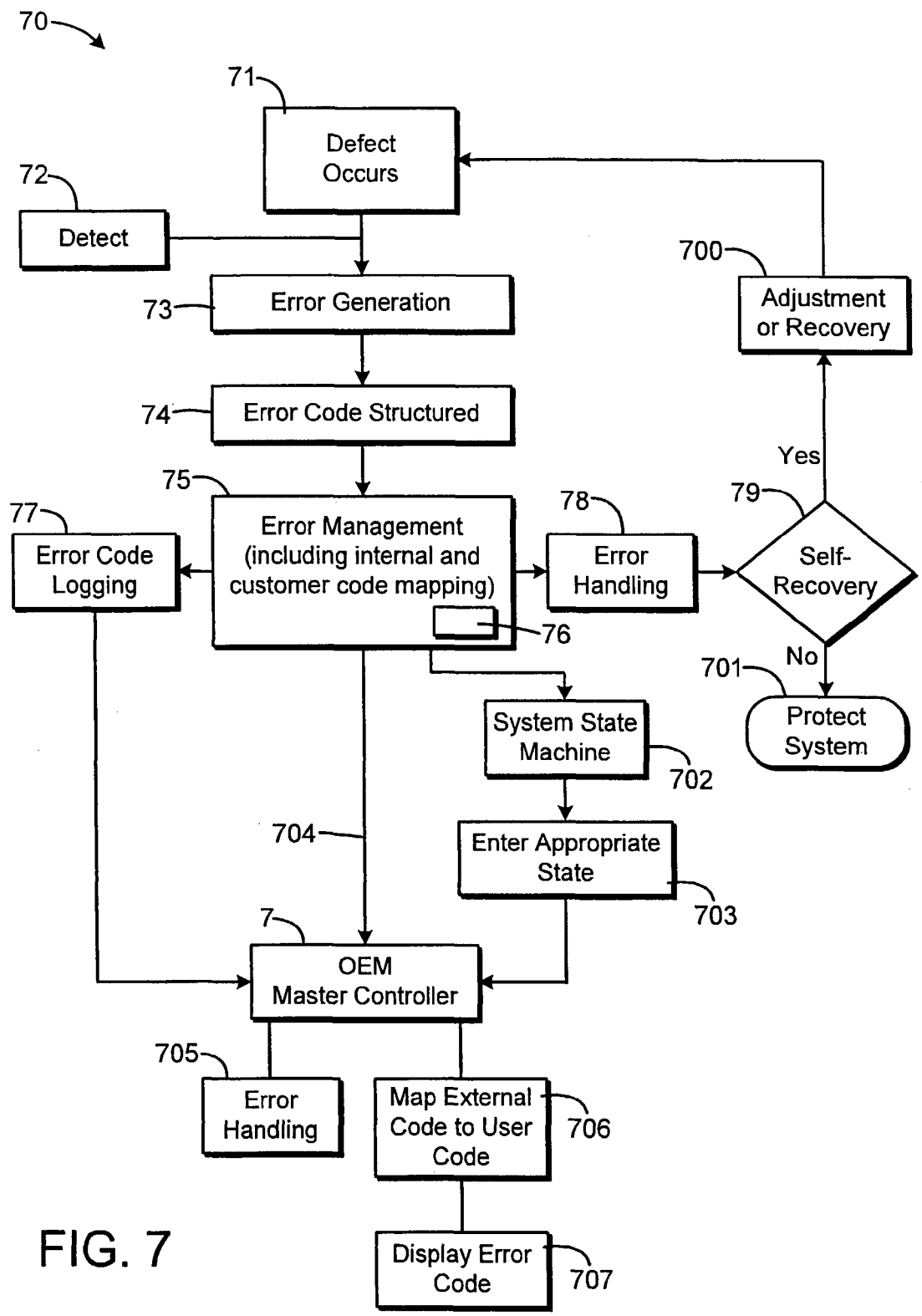
FIG. 7 illustrates an exemplary embodiment of a structured error code system according to an embodiment of the present invention.

FIG. 7 illustrates an exemplary method of operation. In an exemplary embodiment, an error occurs 71 and the error is detected 72. The system may generate an error code 73 and may structure the error code 74. In an exemplary embodiment, some software components are programmed to generate an internal error code, where the error code is pre-programmed into the software or firmware and where generating the error code includes structuring the error code. In an exemplary embodiment, some error detection software components may include object oriented programs, in which the program for detecting an error in one component is the same as for another component. For example, in the case of an imager with a printhead with several pens, the error detection software may generate a partial internal error code, in which a place holder is in the index position. The diagnostic software component may be programmed to dynamically determine which of the pens was affected and structure the internal error code to include all of the identifying information.

An internal error code may be delivered to or accessed by an error code management system for error management 75. In an exemplary embodiment, the error code management system may map 76 the internal error code to an external error code. In an exemplary embodiment, the internal error code and external error code may be logged 77.

In an exemplary embodiment, the internal error code may be delivered to or accessed by an error handling system for error handling 78. In an exemplary embodiment the error handling 78 may include using a software component programmed to take action responsive to an error code. The error handler may parse the internal error code and determine 79 whether the system can take self-recovery action, in which case the error handler may cause the controller to cause the system to adjust or recover 700. If the error handler cannot take self-recovery action, the error handler may take action 701 to protect the system, for example by shutting down the system. In an exemplary embodiment, the action taken may be determined, at least in part by, the severity of the error as indicated by the severity bit field of the internal error code. For example, the error handler may cause the sub-system to shut down the system immediately when the severity is the highest severity, may shut down the system normally when the error is a higher severity and may pause operation—for example pause printing in the case of an imager sub-system—when the severity is high, where highest, higher and high correspond to severities listed in Table 1 above.

In an exemplary embodiment, an internal error code may be provided to or accessed by a system state machine 702. In an exemplary embodiment, the system state machine may include a software component. The system state machine may parse the error code and enter an appropriate state 703 based on information contained in the error code, for example from the severity. In an exemplary embodiment, a sub-system which is an imager sub-system may have six operating states, including error, ready, started, configured, print, intervention and stop (or pause). The system state machine may enter the error state if the severity is severe or higher and may enter the stop or pause state, if the severity is an intervention alert. In an exemplary embodiment, the system/state machine may take no action to change the operating state of the machine if the severity is sufficiently low, for example lower than an intervention alert.

In an exemplary embodiment, the error code management system communicates 704 an external error code to an OEM master controller 7. The master controller may be included in a specific application sub-system which is part of a device which includes the general application sub-system and the specific application sub-system operating in conjunction. In an exemplary embodiment, the master controller 7 may receive the external error code, may parse the external error code and may take some action 705 responsive to the error code. For example, the master controller may be programmed to automatically take action responsive to the external error code. The master controller may also provide 707 a user a visual display reflecting information relating to the error. In an exemplary embodiment, the internal or the customer error code may be retrieved in real time or near real time, or at least be made available for retrieval in real time.

In an exemplary embodiment, the manufacturer specific application sub-system 3 may tailor the information provided to a user according to its own desires. For example, a user may be provided with a visual display 707 of a plain language representation of one or more of the severity, location and recovery action for the error. In an exemplary embodiment, the content of the display may be recovered from memory by mapping 706 the parsed external error code to an appropriate, corresponding plain language (or other representation) of the information to be provided, including, for example, a user action corresponding to the recovery action encoded in the external error code.

In an exemplary embodiment, the OEM may program the controller to map 706 the recovery action bit field to a user action which may be identical to or different from the default definition of the recovery action under the structured error code system. For example, the master controller may be programmed to map 706 a recovery action to replace a component with a plain language representation to replace the component. In other exemplary embodiments, an OEM may program a master controller to map a recovery action to replace a component to a plain language text to contact the dealer for service. In an exemplary embodiment, the OEM may not want an end user to replace those components but may prefer that end users contact the dealer or authorized service agents for service. In an exemplary embodiment, this may help an OEM retain more control over system reliability and system maintenance. In this way, an OEM can tailor the content of user error reports so that the users will take action that is consistent with the OEMs service plan. In an exemplary embodiment, displaying the error code may include displaying the external error code, without mapping the external error code to a plain language or other representation for an end user. An end user may look up the meaning of the raw, unmapped error code by consulting a guide which explains the error code structure and the meaning of the various bit fields.

Figure 8:
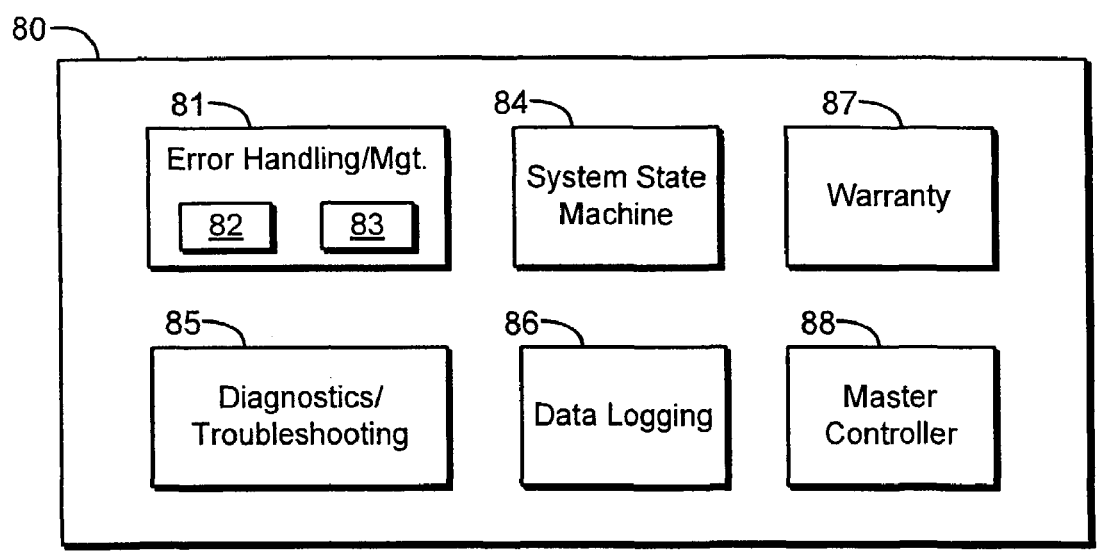
FIG. 8 illustrates a functional block diagram for an exemplary embodiment of a structured error code system according to an embodiment of the present invention.

FIG. 8 illustrates a functional block diagram of a structured error code system 80. In an exemplary embodiment, the system 80 may include system error handling and management 81. The error handling and management 81 may include at least two parts, including, for example: (a). adaptive error handler and management 82 which may be designed to handle and manage all active error codes from error sources; and (b). effective error source detection 83, which may reside all along the system firmware and software and may be used to detect all error conditions and reports error codes to the error handler.

In an exemplary embodiment, a structured error code system 80 may include a system state machine 84. The system state machine 84 may directly use and parse the generated error codes to control system states.

In an exemplary embodiment, a structured error code system 80 may include system diagnostics and troubleshooting 85. System diagnostics and troubleshooting 85 may generate internal and external error codes and may assist in directly repairing or further diagnosing an application subsystem, for example a general application sub-system such as an imager sub-system which may be incorporated into a specific application.

In an exemplary embodiment, a structured error code system may include a data logging system 86. A data logging system 86 may records the generated error codes, for example internal error codes and external error codes, into a system history recording database.

In an exemplary embodiment, a structured error code system 80 may include a warranty system 87. The warranty system 87 may use the recorded history of error codes from a data logging system 86 to do statistics and determine acceptable warranty length, replaceable parts requirements and/or service costs.

In an exemplary embodiment, a structured error code system 80 may include a specific application sub-system master controller 88. The specific application sub-system master controller 88 may periodically poll the general application sub-system controller to determine the status and may be programmed to take appropriate action based on external error codes provided from the general sub-system controller.

In an exemplary embodiment, a structured error code system 80 may indicate event severity to prioritize events and guide the actions of the imager system state machine 84 and even end users. A structured error code system 80 may reflect the error or problem event source, which may describe the error location and help in system diagnostics and troubleshooting 85. The structured error code system 80 may include a recommended recovery action to assist an end user in servicing the product.

In an exemplary embodiment, a structured error code system 80 may make it easy to store and transfer the error code since it is represented by an unsigned integer. In addition, it may facilitate implementing an integer hash table algorithm for fast searching which may be conveniently accomplished. In an exemplary embodiment, a structured error code system may be scalable for different platforms and extended products due to its well structured pattern.

In an exemplary embodiment, structured error codes may be easily parsed by firmware software and OEM application software, and may be well readable and easily decoded by end users and OEM partners, may be easily extended and merged since each field is independently defined.

In an exemplary embodiment, it may be easy to map between internal error code and customer error code since both use the same structure. It may also be desirable to classify events based on the severity or component ID field, which may be helpful for display and statistics.

In an exemplary embodiment, providing structured error codes may facilitate taking appropriate corrective action since the fields of recovery action and error number are categorized. In an exemplary embodiment, a structured error code system may facilitate implement and integrate a general sub-system with a specific sub-system, even where different computer languages are used.

In an exemplary embodiment, a structured error code system may be conveniently scalable for error management in the system level and component level based on the structured fields.

In an exemplary embodiment, a structured error code system may facilitate error history recording since each structured error code contains sufficient information to identify all desired error related information.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of reporting errors in an electronically controlled device, comprising:
   generating a first bit field representative of a severity of an internal error;
   generating a second bit field representative of a location of the internal error, including generating a plurality of component bit fields corresponding to at least one of a component, module, or index, wherein the plurality of component bit fields comprises a component bit field corresponding to the component, wherein the component bit field includes a number selected to identify the component by the lowest level of a hierarchical component topology;
   generating a third bit field representative of a cause of the internal error;
   structuring an internal error code, wherein the internal error code includes the first, second and third bit fields;
   mapping the internal error code to a corresponding external error code;
   wherein the internal error code and the external error code each include a bit field that identifies an error code as being one of the internal error code or the external error code.

2. The method of reporting errors in an electronically controlled device in accordance with claim 1,
   wherein the external error code includes a fourth bit field representative of a recovery action to be taken responsive to the internal error.

3. The method of reporting errors in an electronically controlled device in accordance with claim 2, wherein the external error code does not include the third bit field.

4. The method of reporting errors in an electronically controlled device in accordance with claim 2, further comprising:
   storing the internal error code in memory in a first sub-system; and
   communicating the external error code to a second sub-system, wherein the second sub-system comprises a master controller.

5. The method of reporting errors in an electronically controlled device in accordance with claim 4, further comprising:
   mapping the external error code to a user action message; and
   providing a visual display of the user action message.

6. A method of operating an electronically controlled device, comprising:
   operating a first sub-system, wherein the first sub-system comprises a first controller;
   diagnosing an internal error occurring within the first sub-system;
   generating an internal error code, wherein the internal error code includes bit fields representative of a first set of information corresponding to the internal error including identifying a component having the internal error by the lowest level of a hierarchical component topology;
   mapping the internal error code to a corresponding external error code, wherein the external error code includes bit fields representative of a second set of information corresponding to the internal error;
   logging the internal error code in memory within the first sub-system;
   communicating the external error code to a second sub-system, wherein the second sub-system comprises a master controller for the first and second sub-systems;

logging the external error code in memory within the first sub-system;
wherein the first set of information includes at least some information which is not included in the second set of information.

7. The method of claim 6, wherein the second set of information includes at least some information which is not included in the first set of information.

8. The method of operating an electronically controlled device in accordance with claim 6, wherein the first set of information includes information relating to a severity of the internal error, a component experiencing the internal error and a cause of the internal error, and wherein the second set of information includes information relating to the severity, the component and a recovery action to be taken responsive to the error.

9. The method of operating an electronically controlled device in accordance with claim 6, further comprising:
automatically taking action responsive to the internal error code, wherein the automatically taking action is performed, at least in part, by the first controller.

10. The method of operating an electronically controlled device in accordance with claim 6, further comprising:
parsing the external error code, wherein parsing the external error code is performed, at least in part, by the second controller; and
generating a user action message for display to a user.

11. A method of reporting errors in an electronically controlled device, comprising:
diagnosing an internal error;
generating an internal error code, wherein the internal error code represents information relating to a severity and a location of the error and an error identifier, including generating a plurality of component bit fields corresponding to at least one of a component, module, or index, wherein the plurality of component bit fields comprises a component bit field corresponding to the component, wherein the component bit field includes a number selected to identify the component by the lowest level of a hierarchical component topology;
generating an external error code, wherein the external error code represents information relating to the severity of the internal error, to the location of the internal error and to a user action responsive to the internal error, wherein generating the user error code comprises selecting the user action from a pre-programmed list of user actions, wherein the error identifiers in the list of error identifiers have been mapped to corresponding user actions in the list of user actions;
the internal error code and the external error code each including a bit field that identifies an error code as being one of the internal error code or the external error code;
logging the internal error code in an internal error code history; and
providing a visual representation of the user action.

12. An imaging device, comprising:
a general imaging application sub-system, wherein the imaging application sub-system comprises a controller for controlling the imaging application sub-system, sensors for sensing conditions indicative of a plurality of internal errors, and memory, wherein the memory includes software instructions for diagnosing the plurality of internal errors and includes software instructions for generating an internal error code corresponding to an internal error and for generating an external error code responsive to the internal error, wherein the internal error code identifies a component having the internal error by the lowest level of a hierarchical component topology, wherein the internal error code and the external error code each include a bit field identifying an error code as being one of the internal error code or the external error code; and wherein the instructions for generating the external error code include mapping the internal error code to a suggested recovery action.

13. The imaging device, according to claim 12, further comprising a specific application sub-system connected to the general imaging application sub-system at least through a communications connection, wherein the imaging device communicates the external error code to the specific application sub-system through the communications connection and does not communicate the internal error code to the specific application sub-system.

14. An electronically controlled device, comprising:
a first sub-system including a memory;
a first controller for controlling the first sub-system;
a diagnostics unit for detecting internal errors in the first sub-system and generating an internal error code responsive to a detected internal error, wherein the internal error code identifies a component having the internal error by the lowest level of a hierarchical component topology, and, wherein the first controller maps the internal error code to a corresponding external error code; and
a communications output arranged for communicating the external error code to a second sub-system;
wherein the internal error code and the external error code are logged in the memory of the first sub-system.

15. The electronically controlled device of claim 14, further comprising:
a second sub-system;
a second controller for controlling the second sub-system, wherein the second controller comprises a master controller for the first sub-system;
a communications input, arranged for receiving the external error code from the first sub-system.

16. The electronically controlled device of claim 14, wherein the first sub-system comprises an imaging sub-system.

17. The electronically controlled device of claim 14, wherein the electronically controlled device comprises a printer and the first sub-system comprises an imaging sub-system.

18. The electronically controlled device of claim 14, wherein the internal error code comprises information relating to the severity, location and cause of the internal error and the external error code comprises information relating to the severity, location and recovery action.

19. An electronically controlled device, comprising:
a first sub-system, wherein the first sub-system comprises a first controller;
a computer readable medium comprising instructions for diagnosing an internal error occurring within the first sub-system, comprising instructions for generating an internal error code corresponding to the internal error, wherein the internal error code includes bit fields representative of a first set of information corresponding to the internal error, wherein the internal error code identifies a component having the internal error by the lowest level of a hierarchical component topology, and comprising instructions for mapping the internal error code to a corresponding external error code, wherein the external error code includes bit fields representative of a second set of information corresponding to the internal error, wherein the first set of information includes at least some information which is not included in the second set of information, and wherein the internal error code and the external error code each include a bit field that identifies an error code as being one of the internal error code or the external error code.

20. The electronically controlled device of claim 19, wherein the second set of information includes at least some information which is not included in the first set of information.

21. The electronically controlled device of claim 19, wherein the first set of information includes information relating to a severity of the internal error, a component experiencing the internal error and a cause of the internal error, and wherein the second set of information includes information relating to the severity, the component and a recovery action to be taken responsive to the error.

22. The electronically controlled device of claim 19, wherein the machine readable medium comprises instructions for logging the internal error code in memory within the first sub-system and for communicating the external error code to a second sub-system, wherein the second sub-system comprises a master controller for the first and second sub-systems.

23. The electronically controlled device of claim 22, wherein the instructions for logging comprise instructions for logging the external error code in memory within the first sub-system.

24. The electronically controlled device of claim 19, wherein the machine readable medium comprises instructions for having the controller automatically take action responsive to the internal error code.

25. The electronically controlled device of claim 22, wherein the second sub-system comprises a machine readable medium comprising instructions for parsing the external error code and generating a user action message for display to a user.

26. A method of operating an electronically controlled device, comprising:
  handling and managing errors, wherein handling and managing errors comprises detecting errors in a first sub-system, generating internal error codes corresponding to the errors including identifying a components having the internal errors by the lowest level of a hierarchical component topology, and mapping the internal error codes to corresponding external error codes,
  diagnosing and troubleshooting the errors, wherein diagnosing and troubleshooting comprises arranging the first sub-system to automatically take action responsive to some of the errors;
  controlling the system state of at least the first sub-system responsive to the internal error code;
  logging the internal error codes and the external error codes in an error code history log in a memory of the first sub-system;
  controlling the electronically controlled device, wherein controlling the electronically controlled device comprises having a master controller in a second sub-system periodically poll the first sub-system and having the master controller take appropriate action responsive to an external error code provided by the first sub-system.

27. The method of operating an electronically controlled device according to claim 26, further comprising analyzing the error code history log for use in warranty service and/or planning.

28. A processor-readable medium having processor-executable instructions therein which, when executed by a processor, cause the processor to:
  generate a first bit field representative of a severity of an internal error;
  generate a second bit field representative of a location of the internal error, including generating a plurality of component bit fields corresponding to at least one of a component, module, or index, wherein the plurality of component bit fields comprises a component bit field corresponding to the component, wherein the component bit field includes a number selected to identify the component by the lowest level of a hierarchical component topology;
  generate a third bit field representative of a cause of the internal error;
  structure an internal error code, wherein the internal error code includes the first, second and third bit fields;
  map the internal error code to a corresponding external error code, wherein the external error code includes a fourth bit field representative of a recovery action to be taken responsive to the internal error; and
  wherein the internal error code and the external error code each include a fifth bit field that identifies an error code as being one of the internal error code or the external error code.

* * * * *